United States Patent
Mansoor et al.

(10) Patent No.: US 8,334,616 B2
(45) Date of Patent: Dec. 18, 2012

(54) PHOTOVOLTAIC INTEGRATED VARIABLE FREQUENCY DRIVE

(75) Inventors: Arshad Mansoor, Oak Ridge, TN (US); Satish Rajagopalan, Knoxville, TN (US); Jih-Sheng Lai, Blacksburg, VA (US); Faisal Habib Khan, Knoxville, TN (US)

(73) Assignee: Electric Power Research Institute, Inc., Charlotte, NC (US)

( * ) Notice: Subject to any disclaimer, the term of this patent is extended or adjusted under 35 U.S.C. 154(b) by 1092 days.

(21) Appl. No.: 12/234,156

(22) Filed: Sep. 19, 2008

(65) Prior Publication Data

US 2010/0073969 A1 Mar. 25, 2010

(51) Int. Cl.
*H02J 1/00* (2006.01)
*H02J 3/00* (2006.01)

(52) U.S. Cl. .......................................... 307/80; 307/82

(58) Field of Classification Search .................... 307/43, 307/80, 82, 85
See application file for complete search history.

(56) References Cited

U.S. PATENT DOCUMENTS

| | | | | |
|---|---|---|---|---|
| 7,960,865 B2* | 6/2011 | Jahkonen | | 307/82 |
| 2008/0129120 A1* | 6/2008 | Su et al. | | 307/80 |
| 2008/0150366 A1* | 6/2008 | Adest et al. | | 307/77 |

OTHER PUBLICATIONS

Billy M.T. Ho and Henry Shu-Hung Chung, "An Intergrated Inverter With Maximum Power Tracking for Grid-Connected PV Systems", IEEE Transactions on Power Electonics, vol. 20, No. 4, Jul. 2005, pp. 953-962.
Trishan Estram and Patrick L. Chapman, "Comparison of Photovoltaic Array Maximum Power Point Tracking Techniques," IEEE Transactions on Energy Conversion, vol. 22, No. 2, Jun. 2007, pp. 439-449.
G.W.Hart, H.M. Branze, and C.H.Cox, "Experimental Tests of Open Loop Maximum-Power-Point Tracking Techniques," Solar Cells, vol. 13, pp. 185-195, 1984.
Jinsheng Jiang and Joachim Holtz, "An Efficient Braking Method for Controlled AC Drives With a Diode Rectifier Front End," IEEE Transactions on Industry Applications, vol. 37, No. 5, Sep./Oct. 2001, pp. 1299-1307.
Po Xu, Xing Zhang, Chong-Wei Zhang, Ren-Xian Cao, and Liuchen Chang, "Study of Z-Source Inverter for Grid-Connected Pv Systems".
Fang Zheng Peng, Alan Joseph, Jin Wang, Miaosen Shen, Lihua Chen, Zhiguo Pan, Eduardo Ortiz-Rivera, and Yi Huang, "Z-Source Inverter for Motor Drives," IEEE Transactions on Power Electronics, vol. 20, No. 4, Jul. 2005, pp. 857-863.
Xu-Peng Fang, Zhao Ming Qian, Qi-Gao, Bin-Gut, Fang-Zheng Peng, and Xiao-Ming Yuan, "Current Mode Source Inverter-Fed ASD System," 35TH Annual IEEE Power Electronics Specialists Conference, Aachen, Germany, 2004.
O. Ojo, "Analysis of Current Source Induction Motor Drive FED From Photovoltaic Energy Source," IEEE Transactions on Energy Conversion, vol. 6, No. 1, March 1991, pp. 99-106.

(Continued)

*Primary Examiner* — Carlos Amaya
(74) *Attorney, Agent, or Firm* — Trego, Hines & Ladenheim, PLLC

(57) ABSTRACT

A photovoltaic (PV) integrated variable frequency drive system having a variable frequency drive and an energy source. The variable frequency drive having a back end inverter, a DC bus electrically connected to the back end inverter, and an active front end electrically connected to the DC bus to facilitate bi-directional power flow to and from a power grid. The energy source being electrically connected to the DC bus.

10 Claims, 18 Drawing Sheets

OTHER PUBLICATIONS

M. Barlaud, B. De Fornel, M. Gauvrit, and J.P. Requier, "Computation of Optimal Functions For Transients of a Photovoltaic Array Inverter Induction Motor Generator," IEE Proceddings, vol. 133, Part B, No. 1. pp. 16-20, Jan. 1986.

Soeren Baekhoej Kjaer, John K. Pedersen, and Frede Blaabjerg, "A Review of Single-Phase Grid-Connected Inverters for Photovoltaic Modules," IEEE Transactions on Industry Applications, vol. 41, No. 5, Sep./Oct. 2005, pp. 1292-1306.

J.M.A. Myrzik and M. Calais, "String and Module Integrated Inverters for Single-Phase Grid-Connected Inverters for Photovoltaic Modules," IEEE Bologna Powertech Conference, Jun. 23-26, 2003, Bologna, Italy.

S.J. Chiang, K.T. Chang, and C.Y. Yen, "Residential Photovoltaic Energy Storage System," IEEE Transactions on Industrial Electronics, vol. 45, No. 3, Jun. 1998, pp. 385-394.

D.L. Pulfrey, P.R.B. Ward, and W.B. Dunford, "A Photovoltaic-Powered System for Medium-Head Pumping," Solar Energy, vol. 38, No. 4, pp. 255-265, 1987.

S.R. Bhat, A. Pittet, and B.S. Sonde, "Performance Optimization O Finduction Motor-Pumping System Using Photovoltaic Energy Source," IEEE Transactions on Industry Applications, vol. IA-23, pp. 995-1000, Nov./Dec. 1987.

B.N. Singh, Bhim Singh, B.P. Singh, A-Dhandra, and K. Al-Haddad, "Optimized Performance of Solar Powered Variable Speed Induction Motor Drive," Proceedings of the 1996 International Conference on Power Elctronics, Drives and Energy Systems for Industrial Growth, vol. 1, Jan. 1996, pp. 58-66.

Gyu Park and Seon Ik , "A Thyristor Phase-Controlled Voltage-Source Converter With Bidircetional Power Flow Capability," IEEE Transactions on Industry Applications, vol. 34, No. 5, Sep./Oct. 1998, pp. 1147-1155.

Yaow-Ming Chen, Yuan-Chuan Liu, and Feng-Yu Wu, "Multiinput Converter With Power Factor Correction, Maximum Power Point Tracking, and Ripple-Free Input Currents," IEEE Transactions on Power Electronics, vol. 19, No. 3, May 2004, pp. 631-639.

* cited by examiner

US 8,334,616 B2

PHOTOVOLTAIC INTEGRATED VARIABLE FREQUENCY DRIVE

BACKGROUND OF THE INVENTION

The present invention relates generally to a multi-functional drive system, and more particularly to a photovoltaic (PV) integrated variable frequency drive system.

As the drive to reduce $CO_2$ emissions gathers momentum, alternative energy or distributed sources are gaining importance. These distributed sources include wind, tidal energy, and solar energy. In particular, solar energy, where light energy from the sun is converted into electrical energy using photovoltaic (PV) cells, is becoming one of the most prominent alternative energy resources. In addition to reducing harmful emissions, these distributed sources contribute several ancillary services to the power industry, such as peak power shaving, backup power, and spinning reserve support.

PV-based systems are well known in the art. The most common structure of a grid-connected PV system is shown in FIG. 1. Most PV-based systems include a PV array, DC bus capacitors (not shown), an intermediate DC-DC converter, a DC-AC inverter, and an output filter. The PV arrays include solar cells which may be arranged in any series-parallel combination to obtain a desired DC voltage. The solar cells can also be integrated into buildings as a building-integrated PV (BIPV) system.

The DC-DC converter provides Maximum Peak Power Tracking (MPPT) and a regulated and/or boosted DC voltage for optimal operation of the DC-AC inverter. MPPT schemes are very important in a typical PV system because PV arrays are comprised of semiconductor solar cells whose I-V characteristics depend on the ambient temperature and the irradiance. Thus, the detection of the PV array voltage and current where the generated PV output power will be maximum is of paramount importance.

MPPT schemes automatically detect this optimal operating point and tracking is provided continuously through the operation of the PV system. Various techniques, such as hill-climbing/perturb and track approach, incremental conductance, and fractional open-circuit voltage/short-circuit current detection may be used in the MPPT schemes. These MPPT techniques may be integrated into the DC-DC converter or a separate PV reference cell may also be used.

While FIG. 1 shows a voltage-fed inverter topology, other inverter topologies such as current-fed inverter systems are also common and have a similar structure.

Although there has been a significant amount of research in the area of grid-tied PV systems, most PV-based applications have focused on single-phase integration to the grid. However, there has been some work associated with PV systems using variable frequency drives. Unfortunately, these applications are not multifunctional and use PV as the only source. The topology of one such PV system is shown in FIG. 2. Another application where the utility and PV array are interconnected to the load using a multi-input converter is shown in FIG. 3. This application requires that each source has its own converter.

Accordingly, there is a need for an efficient multi-functional drive system that can function as a grid-tied inverter while integrating a PV array.

BRIEF SUMMARY OF THE INVENTION

These and other shortcomings of the prior art are addressed by the present invention, which provides an efficient multi-functional PV-integrated drive system.

According to one aspect of the present invention, the PV-integrated drive system includes a grid-tied inverter and a variable frequency drive.

According to another aspect of the invention, the PV-integrated drive system feeds PV power back to a grid for use in peak shaving, power quality, or backup applications.

According to another aspect of the invention, a multi-functional integrated drive system includes a variable frequency drive having a back end inverter; a DC bus electrically connected to the back end inverter; and an active front end electrically connected to the DC bus to facilitate bi-directional power flow to and from a power grid. The system further includes an energy source electrically connected to the DC bus.

According to another aspect of the invention, a photovoltaic integrated variable frequency drive system includes a variable frequency drive having a DC-AC inverter for converting a direct current into an alternating current and feeding the alternating current to a motor; a DC bus electrically connected to the DC-AC inverter for providing a direct current to the DC-AC inverter; and an AC-DC converter electrically connected to the DC bus to facilitate bi-directional power flow to and from a power grid. The system further including a photovoltaic array electrically connected to the DC bus for providing a DC current to the DC bus.

According to another aspect of the invention, a photovoltaic integrated variable frequency drive system includes a variable frequency drive having an electric motor; a DC-AC inverter electrically connected to the motor for converting a direct current into an alternating current and feeding the alternating current to the motor; a floating DC bus electrically connected to the DC-AC inverter for providing a direct current to the DC-AC inverter; and an AC-DC converter electrically connected to the DC bus to facilitate bi-directional power flow to and from a power grid. The system further including a photovoltaic array electrically connected to the DC bus for providing a DC current to the DC bus.

BRIEF DESCRIPTION OF THE DRAWINGS

The subject matter that is regarded as the invention may be best understood by reference to the following description taken in conjunction with the accompanying drawing figures in which.

DETAILED DESCRIPTION OF THE INVENTION

Figure 1:
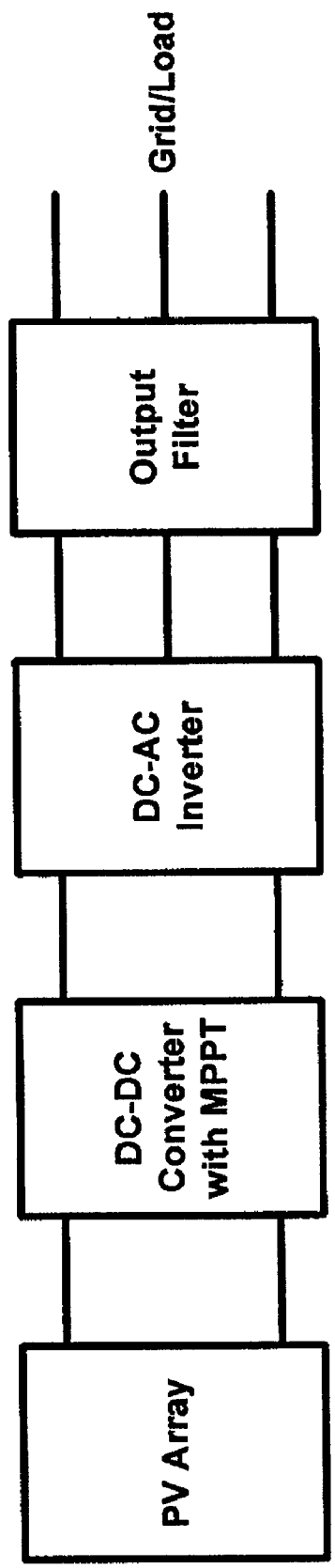
FIG. 1 is a prior art grid integrated PV system.
Figure 2:
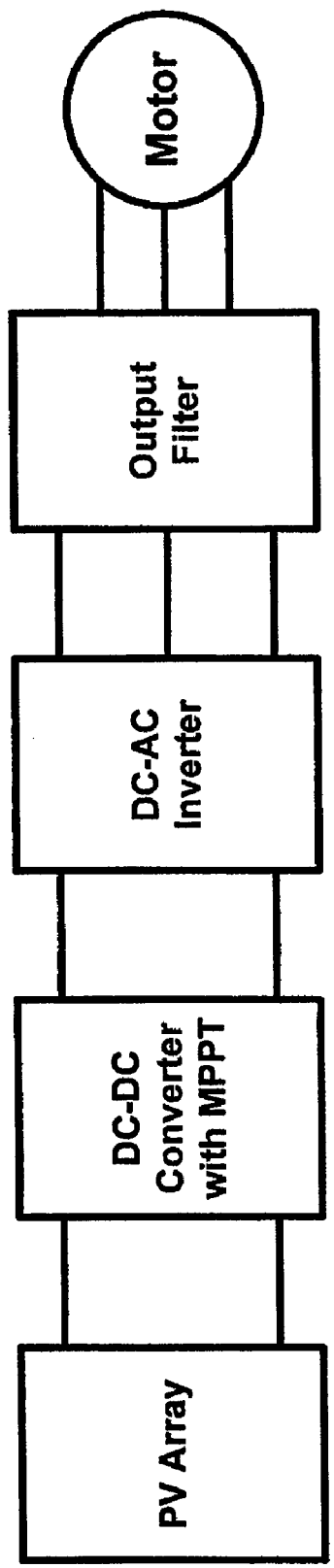
FIG. 2 is a prior art PV-based adjustable motor drive.
Figure 3:
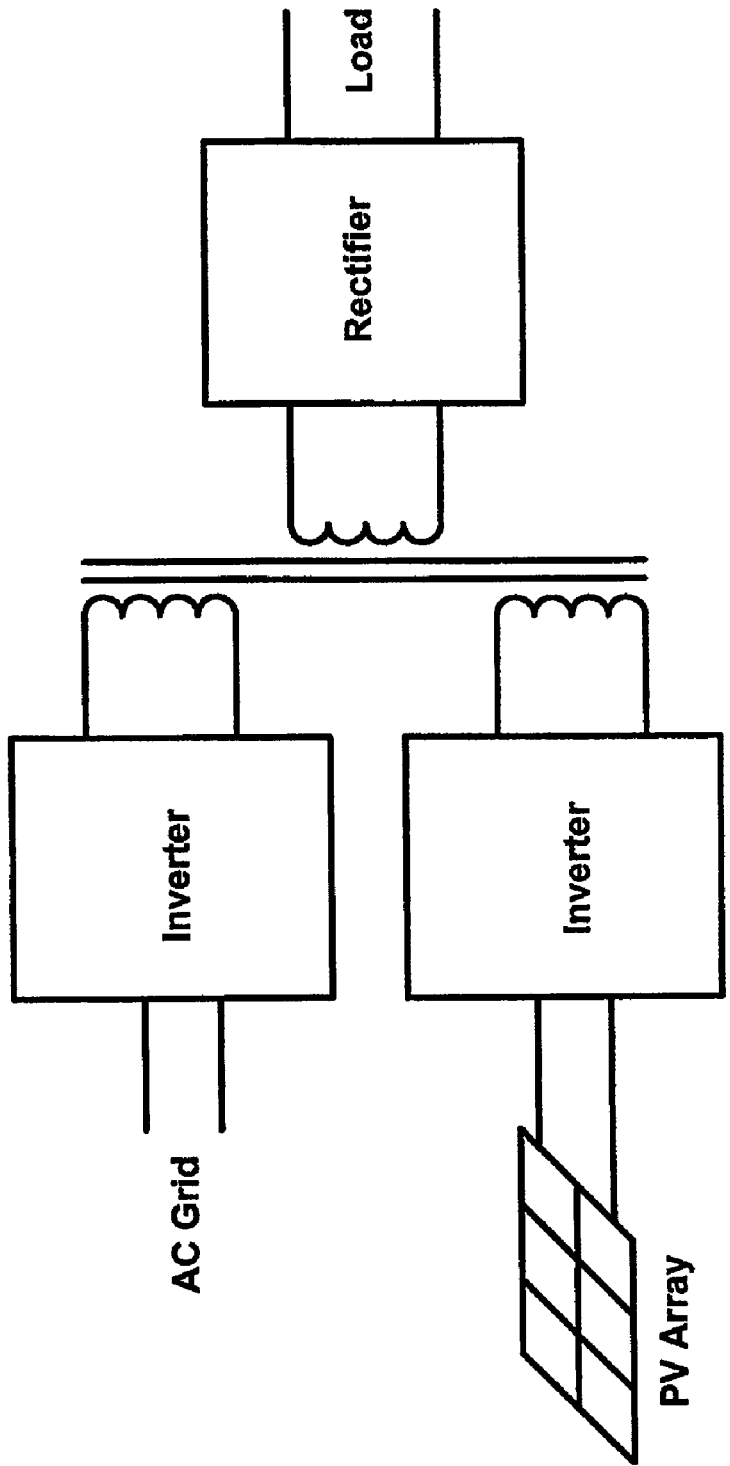
FIG. 3 is a prior art multi-input PV-based grid-tied converter.
Figure 4:
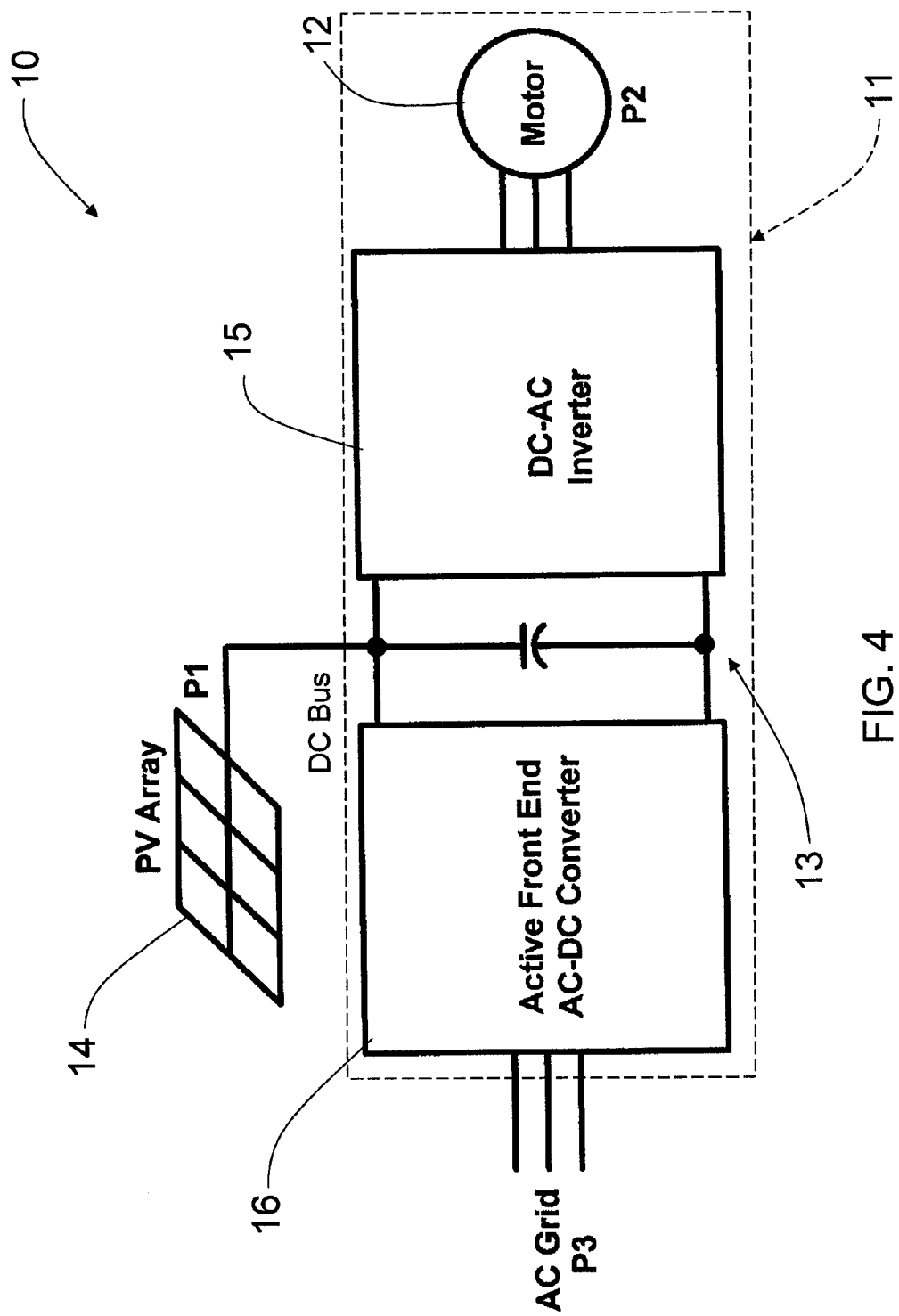
FIG. 4 is a grid-tied inverter/variable frequency drive system according to an embodiment of the invention.

Referring to the drawings, an exemplary PV-integrated variable frequency drive system according to an embodiment of the invention is illustrated in FIG. 4 and shown generally at reference numeral 10. The system 10 uses a grid-tied variable frequency drive 11 (including motor 12) having a DC bus 13 directly modulated by a PV array 14, a DC-AC inverter 15, and a rectifier section or active front end 16 that acts as a grid-tied inverter during certain operating conditions, such as when the PV output is greater than the variable frequency drive load. This allows the variable frequency drive 11 to feed power back into the grid, if needed, for use in peak shaving, power quality, or backup applications. The drive 11 also includes an MPPT algorithm for detecting optimal operating points and continuously tracking the operation of the system 10.

In this approach, the PV array 14 is directly interfaced to the DC bus 13 which allows for modifications to the front-end 16 and back-end inverter 15 portions of the drive 11, thereby eliminating the use of a DC-DC converter to interface the PV array with the DC bus 13 of the inverter 15. This allows the drive front end 16 to become a grid-tied inverter. Because the DC bus 13 is floating and DC bus voltage variations could be large, the inverter 15 maintains normal drive 11 operation by using inverter over modulation or inverter topologies capable of boosting DC bus voltage, such as a Z-source inverter (ZSI). Further, the removal of a separate DC-DC converter reduces converter losses, thereby improving efficiency.

Figure 5:
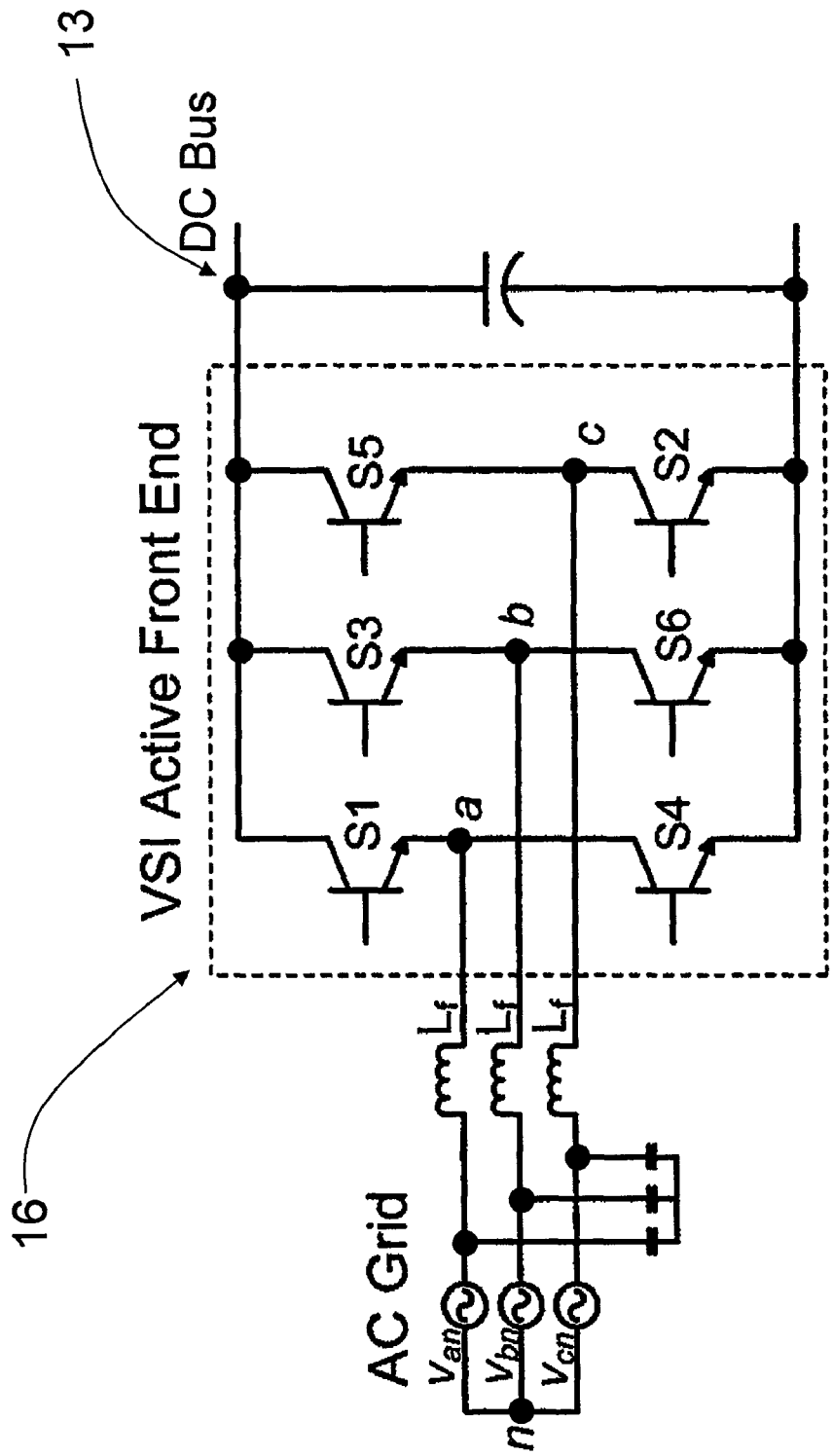
FIG. 5 is a schematic of a voltage source inverter active front end for the system of FIG. 4.
Figure 6:
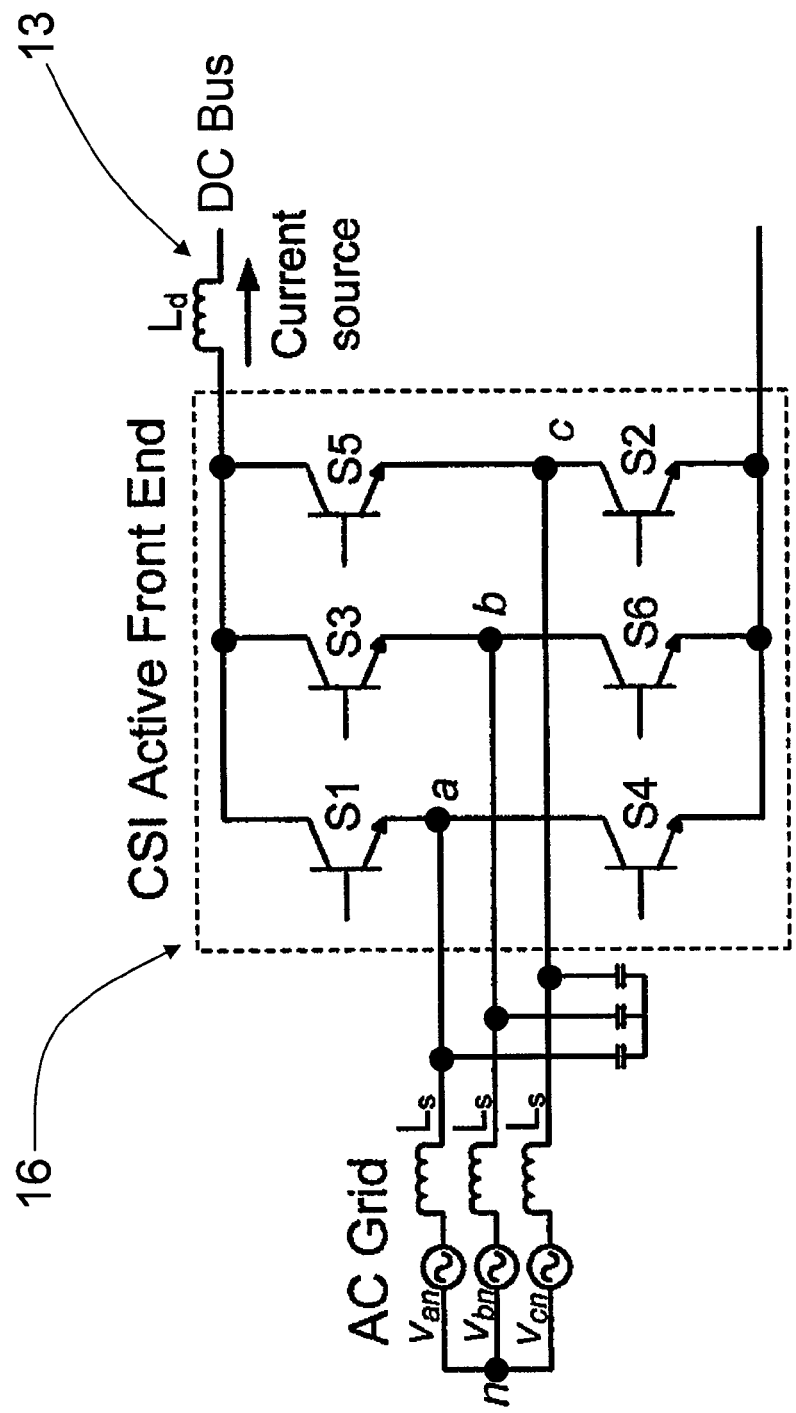
FIG. 6 is a schematic of a current source inverter active front end for the system of FIG. 4.

The active front end (AFE) AC-DC converter 16 facilitates bi-directional power flow to and from the grid through switching of semiconductor devices in the converter. This bi-directional power handling enables excess power to be pushed from the PV array 14 or for regenerative braking energy extracted from the motor 12 of drive 11 to be pushed to the grid. Examples of voltage source inverter (VSI) and current source inverter (CSI) front-ends with active switches S1-S6 are shown in FIGS. 5 and 6, respectively.

Figure 7:
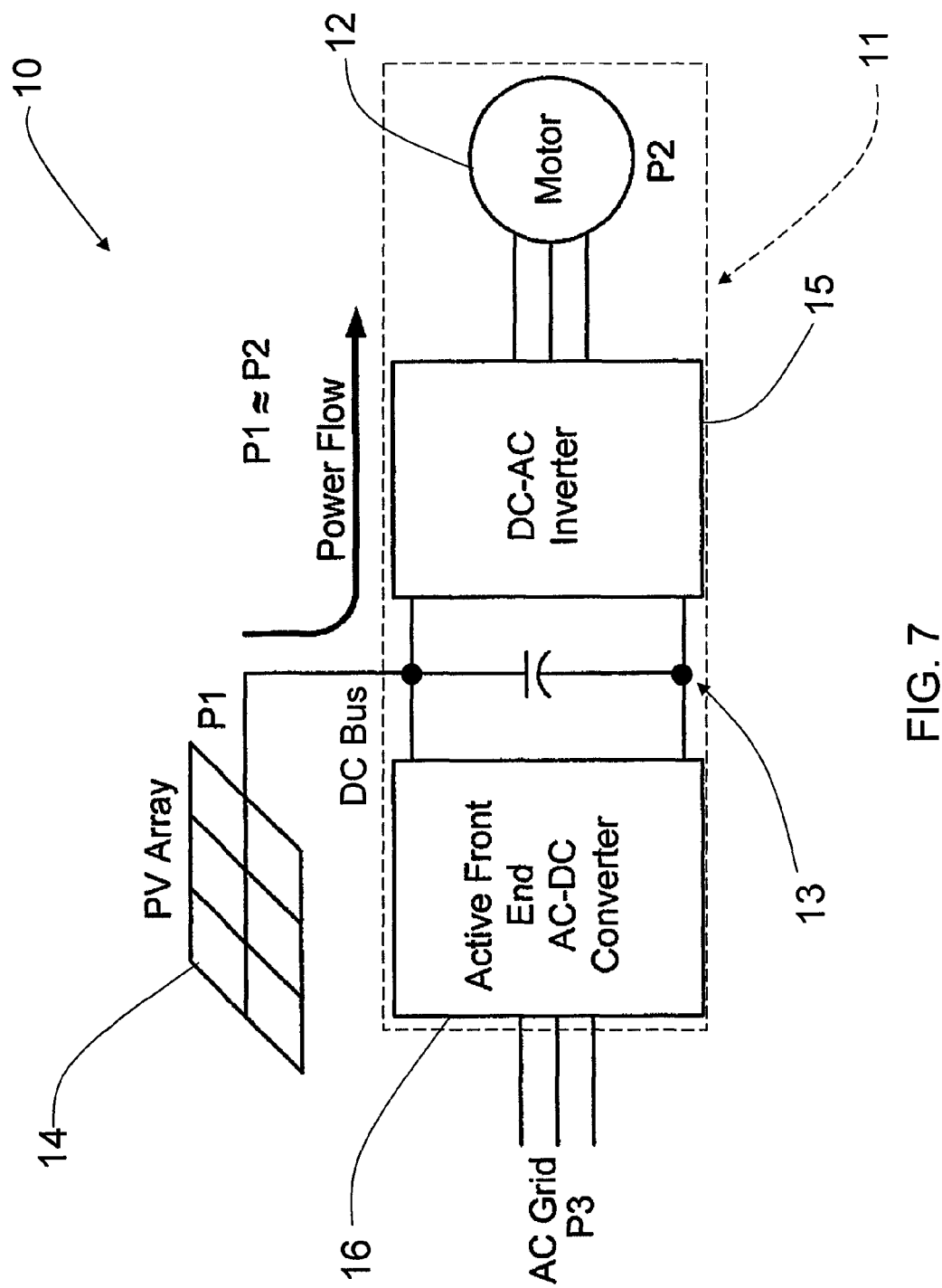
FIG. 7 shows a first mode of operation of the system of FIG. 4.
Figure 8:
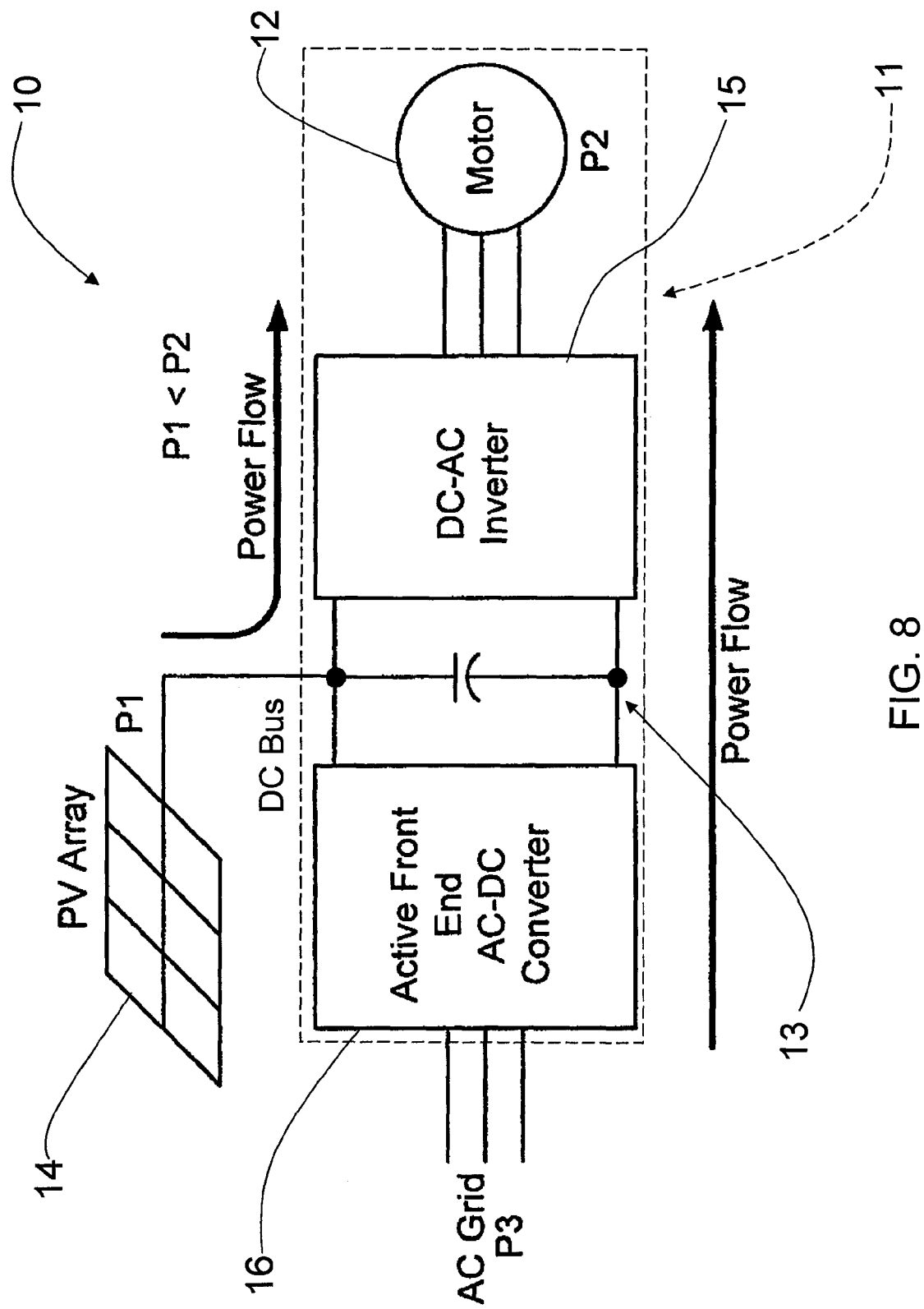
FIG. 8 shows a second mode of operation of the system of FIG. 4.
Figure 9:
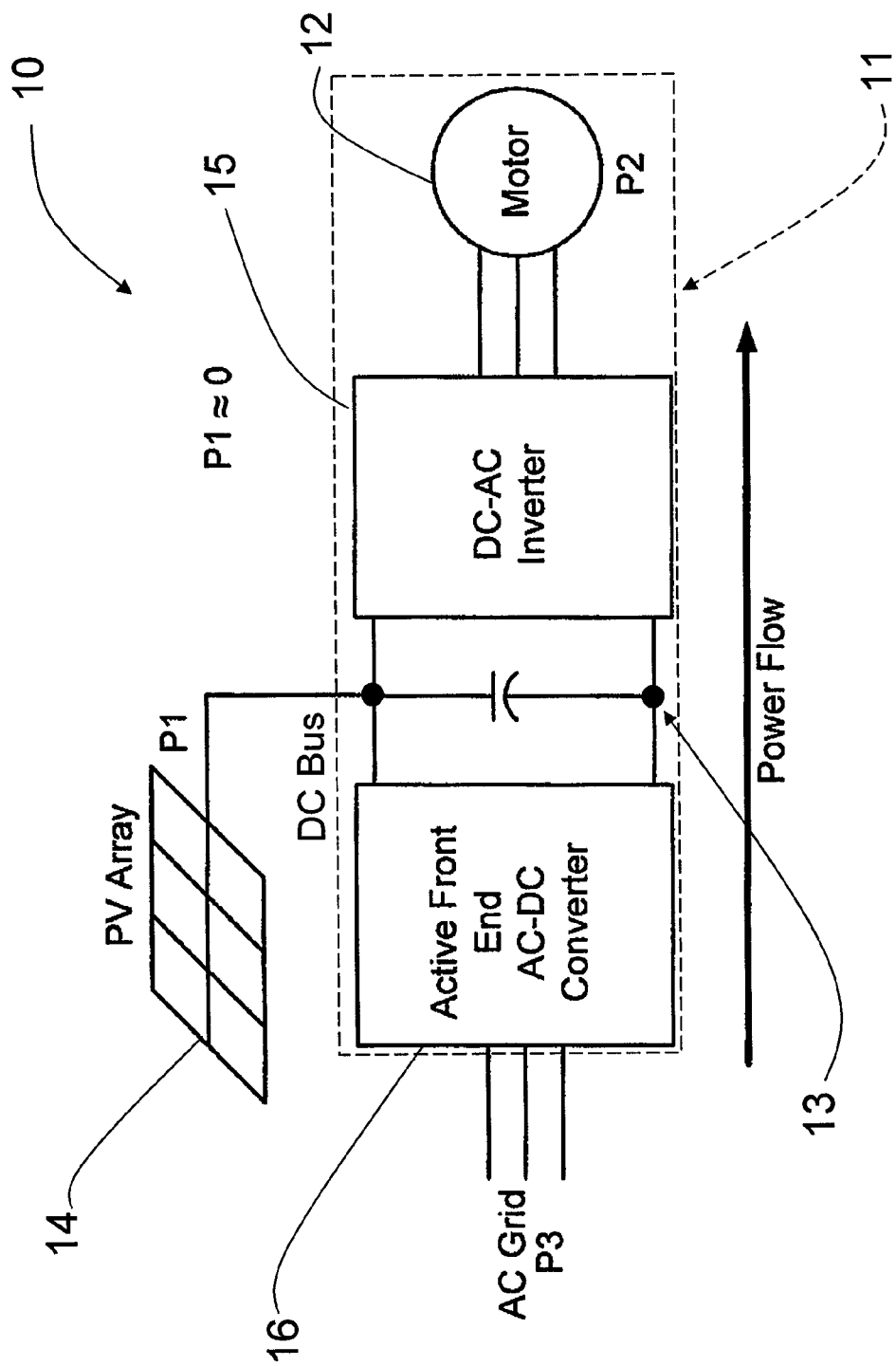
FIG. 9 shows a third mode of operation of the system of FIG. 4.
Figure 10:
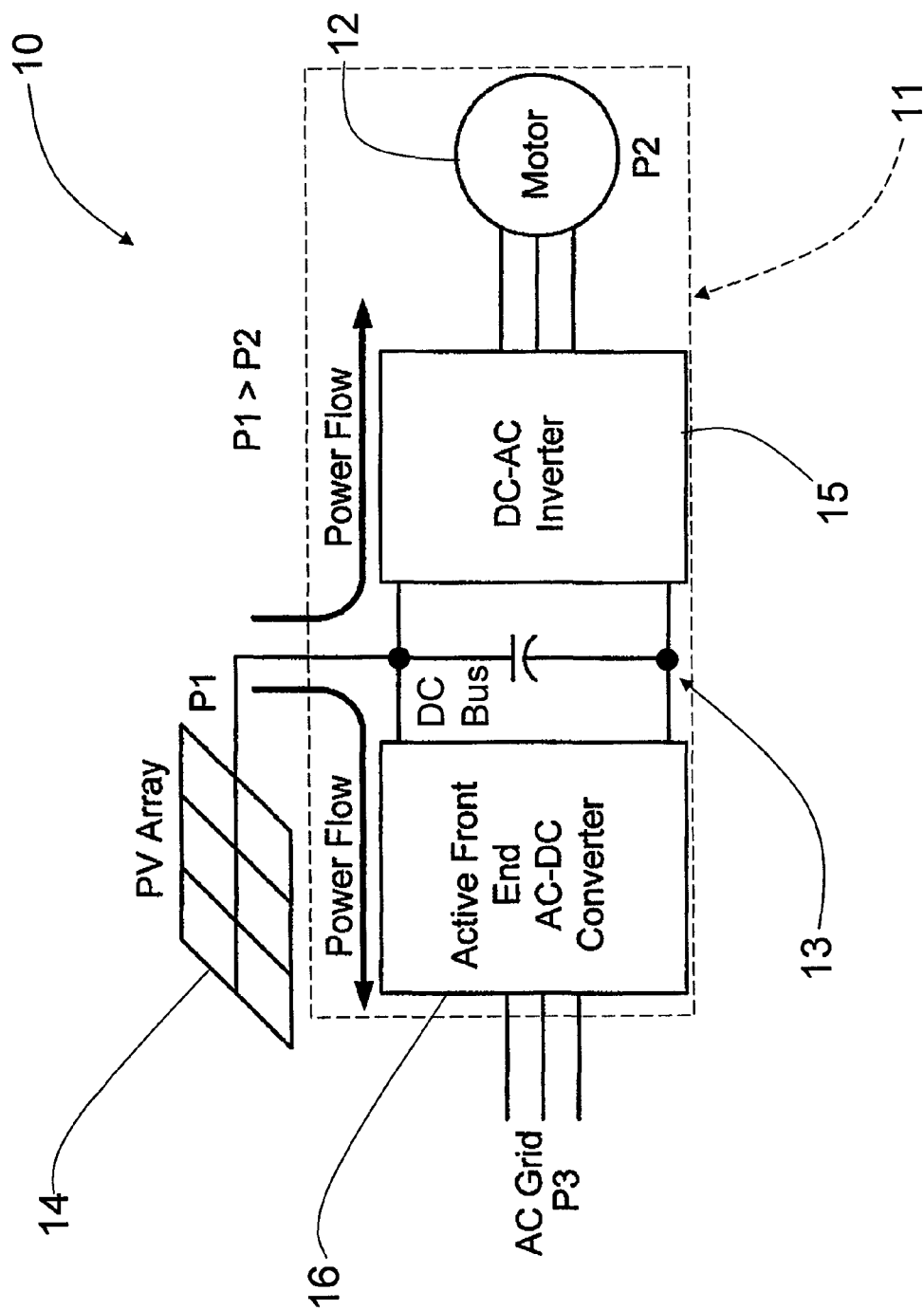
FIG. 10 shows a fourth mode of operation of the system of FIG. 4.
Figure 11:
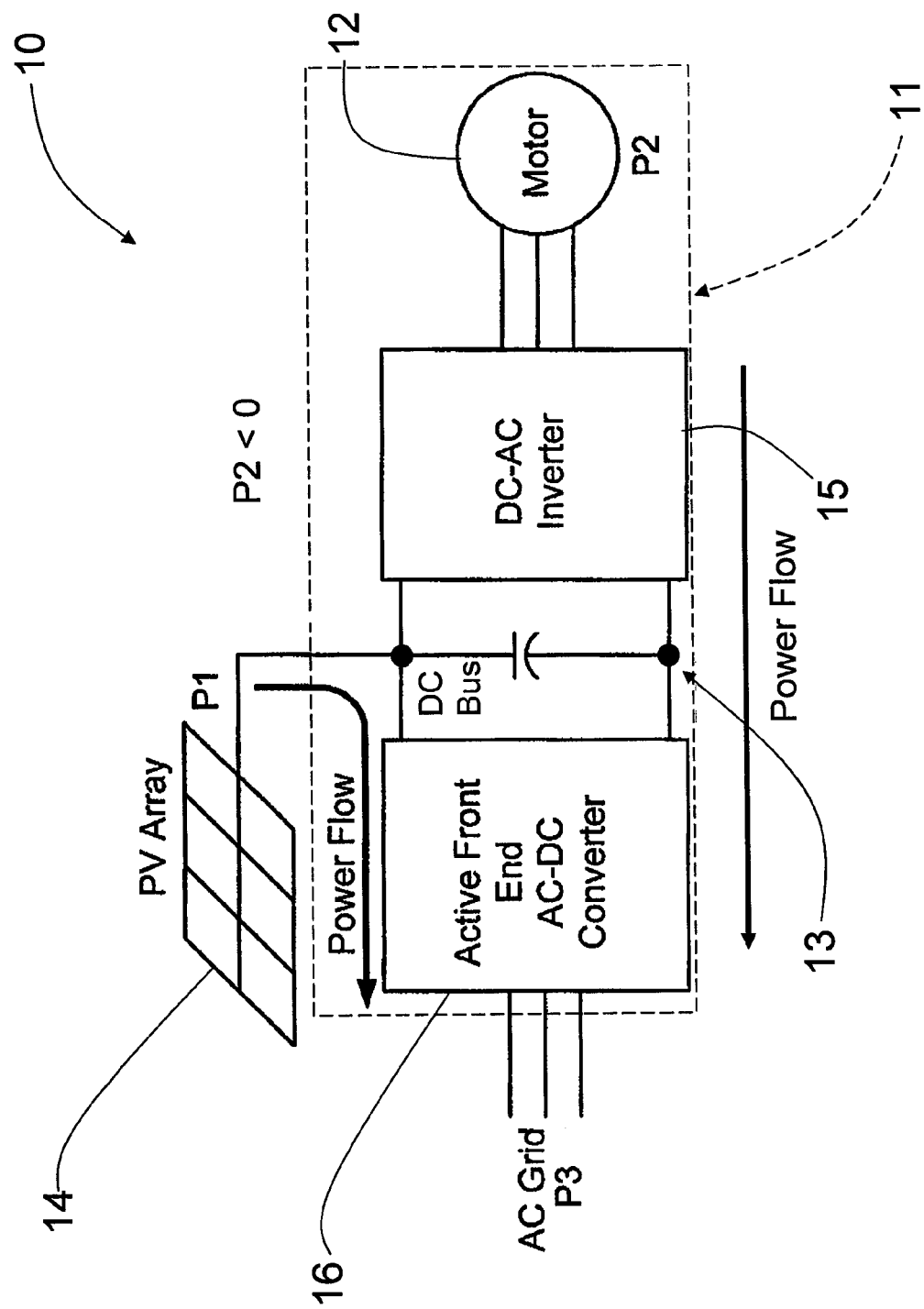
FIG. 11 shows a fifth mode of operation of the system of FIG. 4.

The system 10 has five main modes of operation, which are controlled by PV array power (P1), drive output power (P2), and input AC grid power (P3). A control algorithm is used to synchronize power flow and implement the four main modes of operation. As shown in FIG. 7 (mode 1), if P1≈P2, the motor 12 will be directly supplied by PV power (P1) and grid power (P3) will not be used. In FIG. 8 (mode 2), if P1<P2, then P2≈P1+P3, and all PV power (P1) will be used to drive the motor (P2) and any excess power desired will be derived from the grid (P3). If P1≈0, then P2≈P3 (mode 3). In this case, when PV power (P1) is not available, the drive shall be directly fed from the mains, FIG. 9. As shown in FIG. 10, if P1>P2, then P1≈P2+P3. In other words, if PV array power (P1) is in excess of that required by the motor load (P2), the excess power will be fed back to grid (P3). If P2<0 (regenerative braking), the generated power from the motor 12 may be pushed back to the grid and P3≈P1−P2.

Various schemes may be used with the system 10 to implement a direct DC bus integrated drive system, as illustrated in FIG. 4. As discussed, the system illustrated in FIG. 4 uses the inverter to perform MPPT.

Figure 12:
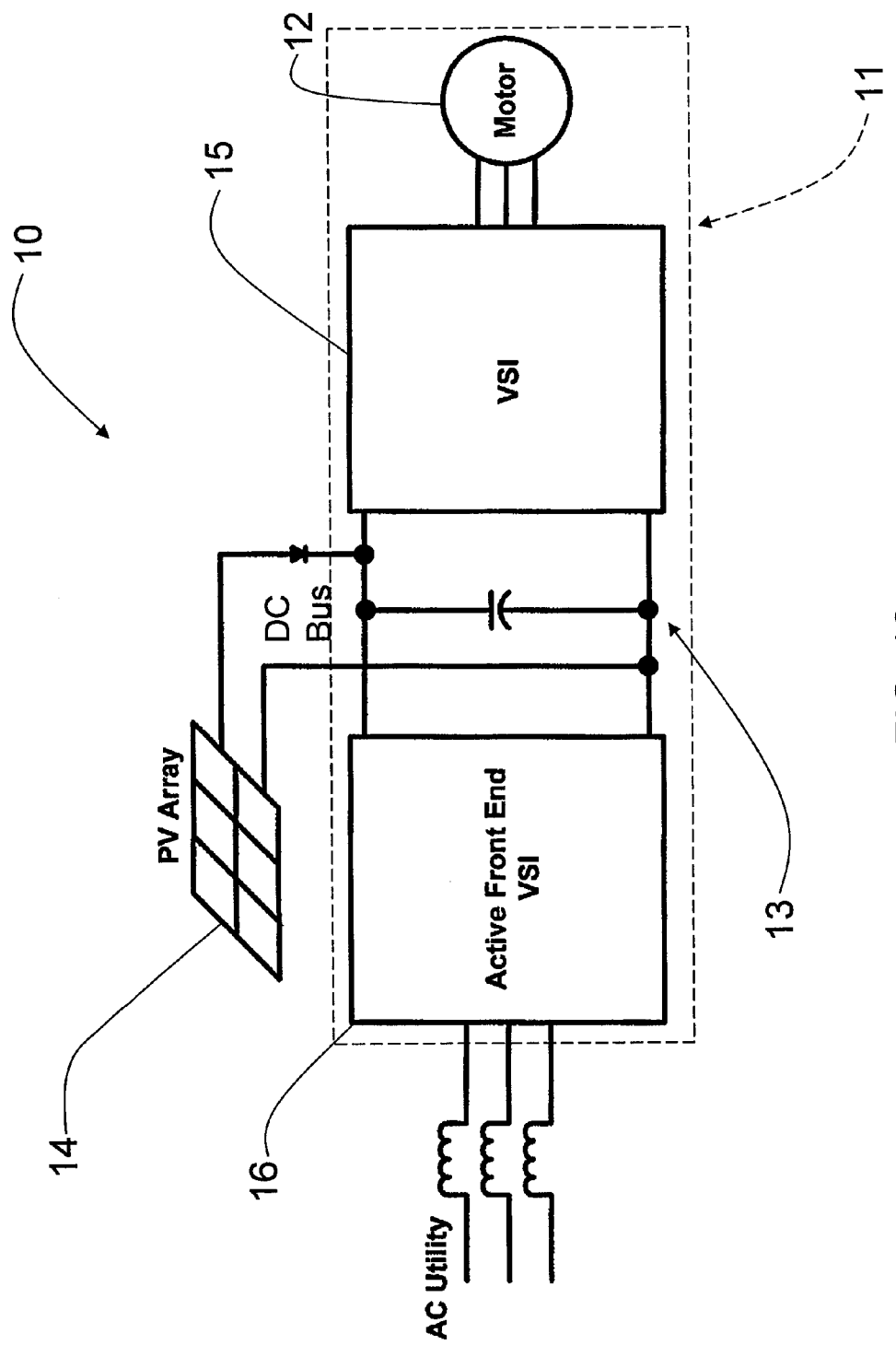
FIG. 12 shows a voltage source inverter based topology for the system of FIG. 4.

The first scheme, shown in FIG. 12, is a Voltage Source Inverter (VSI) topology with an AFE regulating MPPT. This scheme uses two VSIs. The AFE front-end 16 regulates the DC bus-voltage and performs MPPT by maintaining the DC bus at the optimum MPPT voltage. The MPPT may be performed using any suitable algorithm, and may be implemented using one of the following options. In the first option, the AFE 16 may perform MPPT without any external system. In this case the VSI 15 feeding the motor may have to be turned off momentarily to perform MPPT. This method is limited by the amount of time the back-end VSI 15 can be disconnected while not allowing the motor to slow down significantly. This method may be suitable for larger drives that drive high-inertia motors. In the second option, an external reference PV cell can be used with a small MPPT detection circuit. This cell would then relay the optimum array voltage and current information to the AFE 16, which would then regulate the DC bus 13 to the desired voltage. However, the reference cells must be chosen carefully to match the characteristics of the actual PV array. The back-end VSI 15 would function with DC-bus voltages dropping to up to 50% of nominal values. In such cases, the inverter 15 may modulate into a square wave region. If space vector modulation (SVM) is used, the maximum permissible over modulation may be limited to a smaller value. In such cases, the maximum permissible drop in the DC bus voltage will be determined.

The second scheme uses a VSI-based topology with a back-end VSI 15 regulating the MPPT. This scheme is similar to the first scheme, shown in FIG. 12. The major difference between scheme 1 and scheme 2 being the use of the back-end VSI 15 to determine MPPT.

Figure 13:
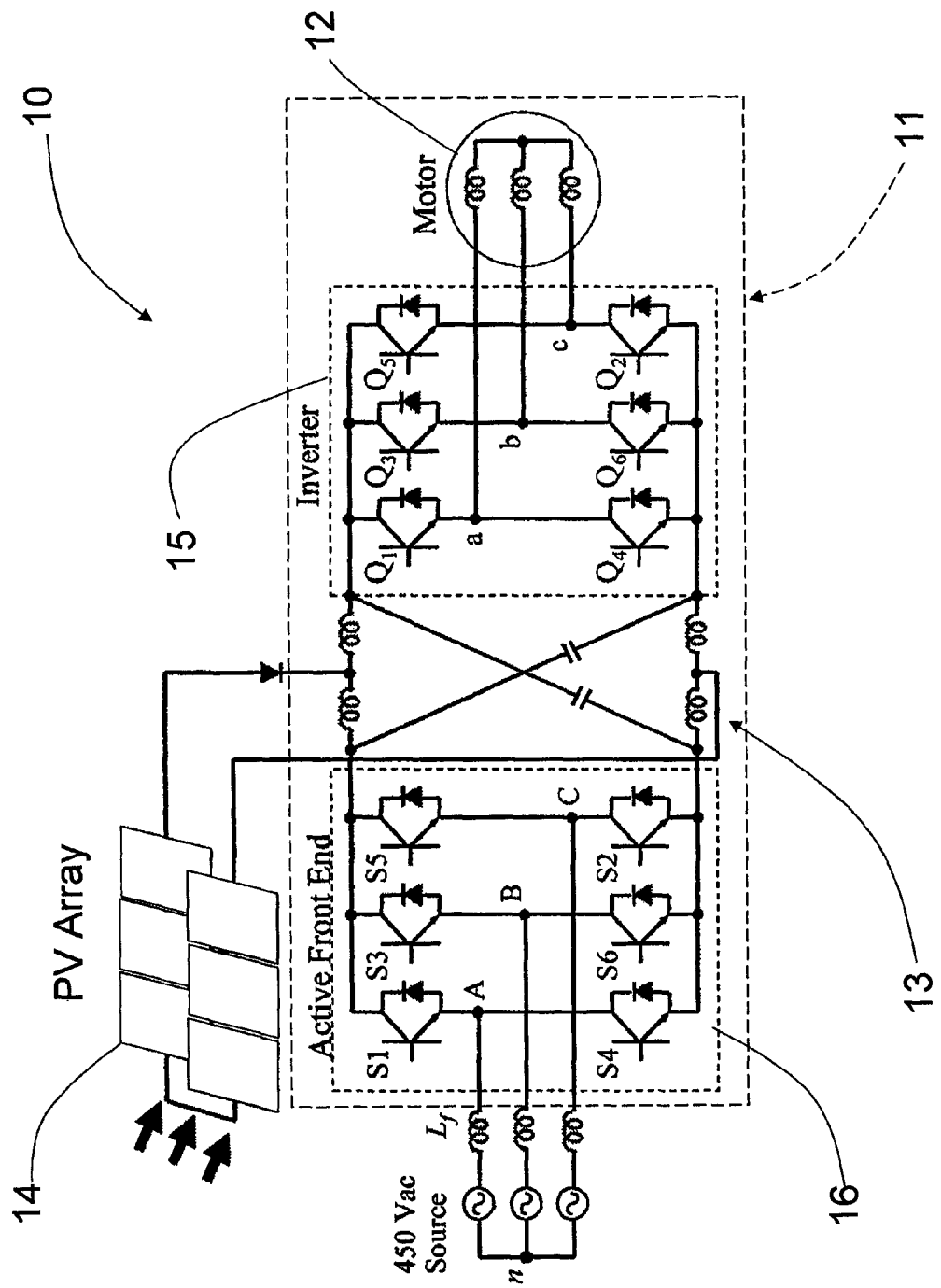
FIG. 13 shows a ZSI based topology for the system of FIG. 4.

The third scheme is shown in FIG. 13 and is a ZSI-based back-end inverter 15 with AFE 16 regulating MPPT. The third scheme provides the ability to deliver a rated output even when the DC bus voltage drops down to 50% of nominal. This scenario is common with a PV array interconnected directly to the DC bus. While it is possible to deliver rated output power when the voltage drops with a VSI scheme using over modulation, poor power quality in the over modulation region often results. A Z-source inverter on the other hand has the ability to boost the output voltage to any level. In this scheme, the PV source is treated as a variable Z-source with impedance regulated by its own MPPT algorithm. The DC bus voltage or current is regulated by the MPPT command. Intelligent pulse width modulation (PWM) is incorporated into the ZSI to meet source regulation.

Figure 14:
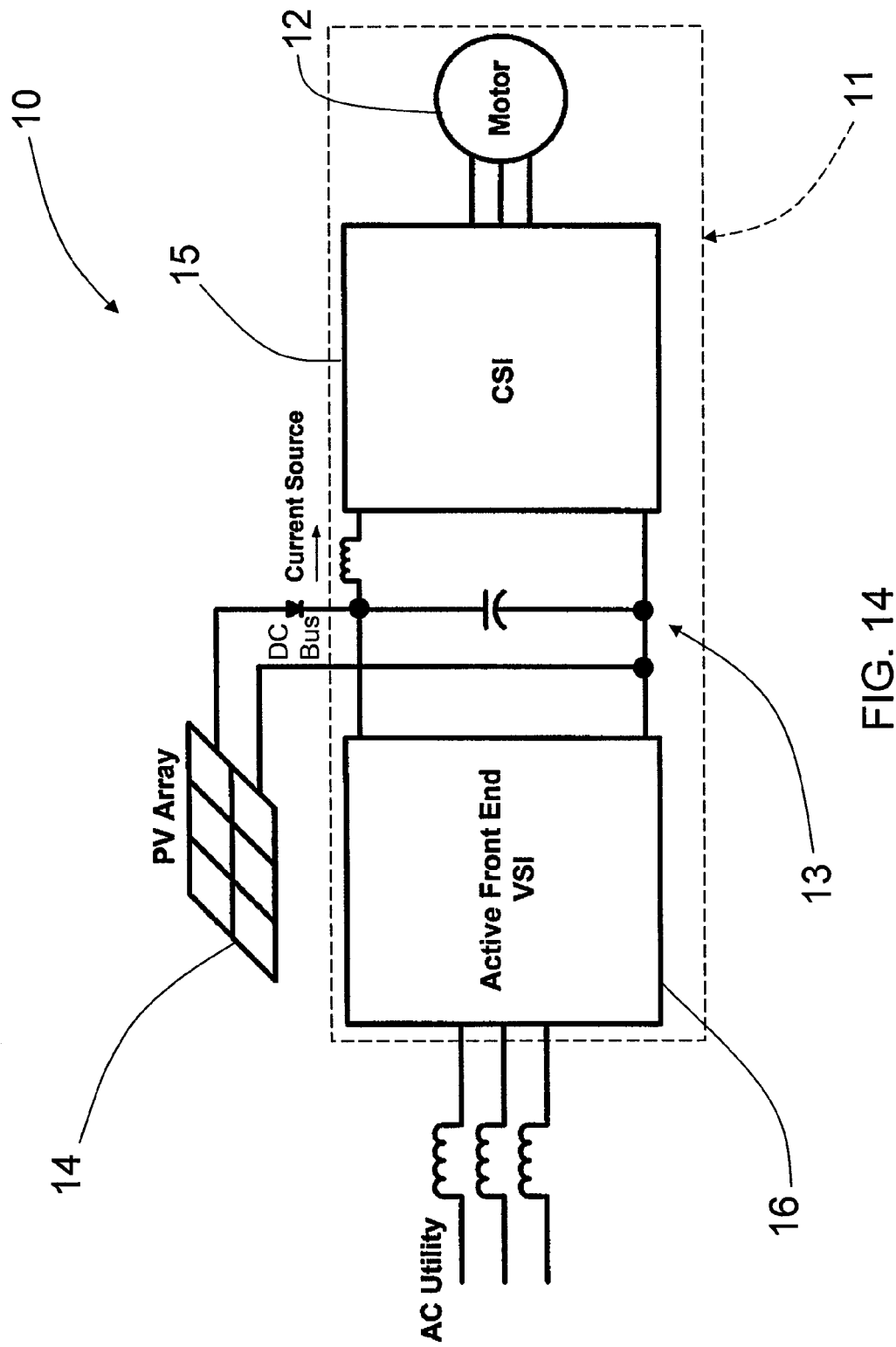
FIG. 14 shows a combination voltage source active front end and current source inverter topology for the system of FIG. 4.

The fourth scheme uses various VSI/CSI/ZSI combinations similar to schemes 1-3 and is shown in FIGS. 14-17. In FIG. 14, an active front-end VSI 16 and CSI back-end 15 is used. The AFE 16 is a voltage source inverter and motor is driven by current source inverter (CSI) 15. PV source is treated as a variable DC current source with current regulated by its own MPPT algorithm. The DC bus 13 is regulated by MPPT. The maximum DC bus voltage equals peak input AC line voltage. The CSI incorporates intelligent PWM to adapt to the bus current regulation.

Figure 15:
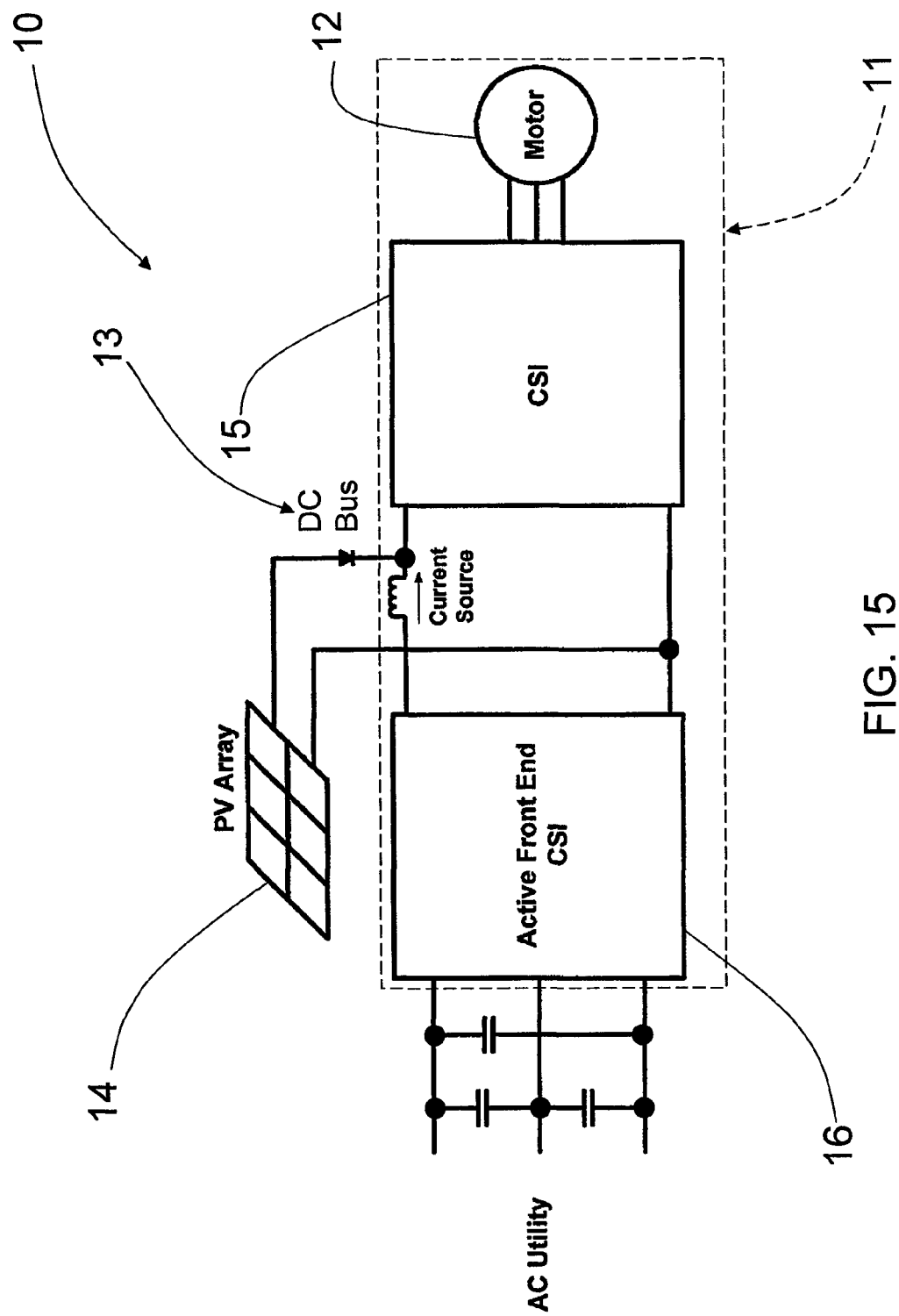
FIG. 15 shows a combination current source active front end and current source inverter topology for the system of FIG. 4.

Referring to FIG. 15, an active front-end CSI 16 and CSI back-end 15 are used. Both AFE 16 and motor drive inverter 15 are current source inverters. PV source is treated as a variable DC current source with current regulated by its own MPPT algorithm. The DC bus 13 is regulated by MPPT. The maximum DC bus voltage equals peak input AC line voltage. The CSI incorporates intelligent PWM to adapt to the bus current regulation.

Figure 16:
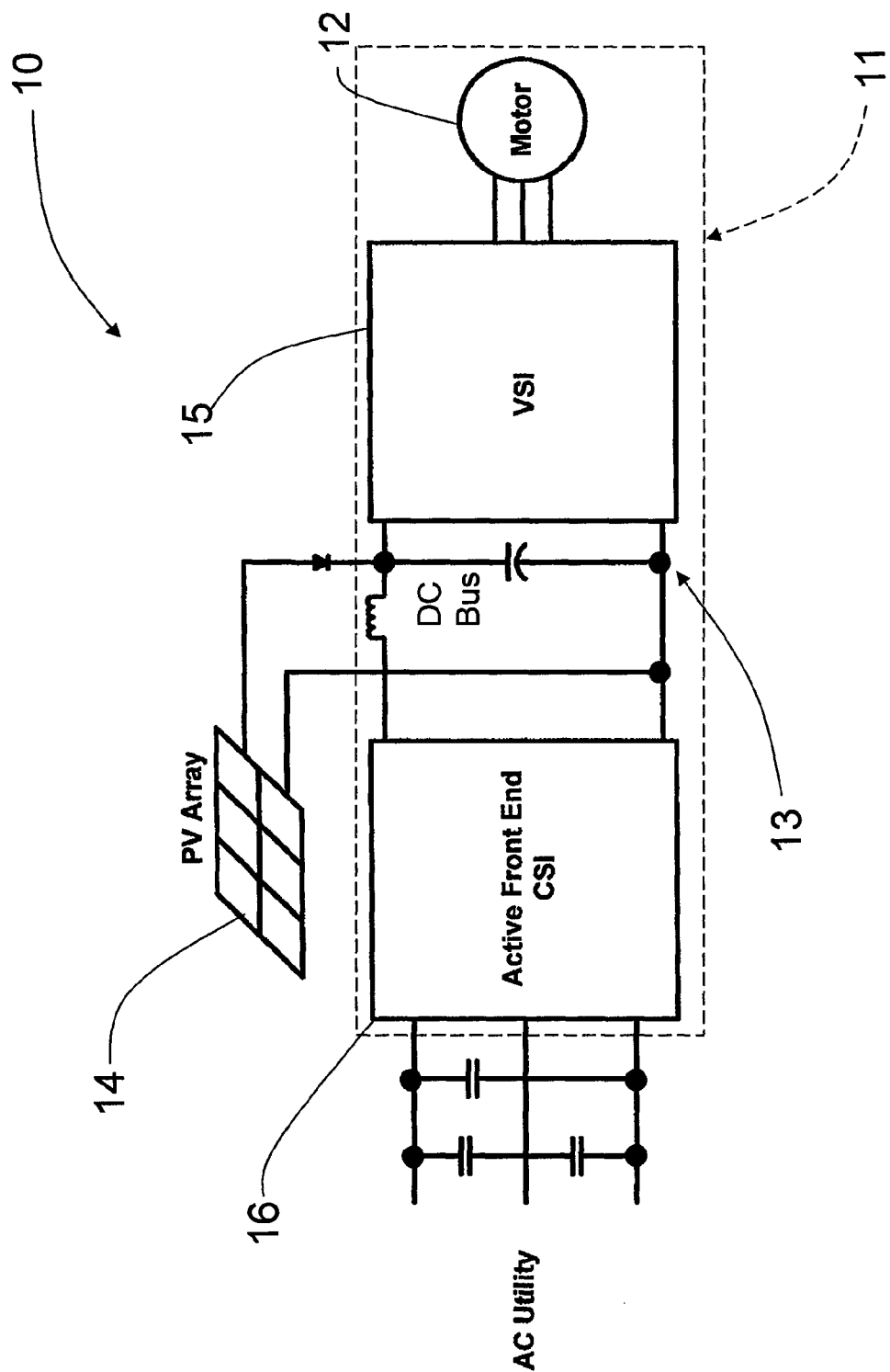
FIG. 16 shows a combination current source active front end and voltage source inverter for the system of FIG. 4.

As shown in FIG. 16, an active front-end CSI 1 and VSI back-end 15 are used. The AFE 16 is CSI and motor drive inverter 15 is VSI. PV source is treated as a variable DC voltage source with voltage regulated by its own MPPT algorithm. DC bus voltage is regulated by the MPPT command. The maximum DC bus voltage equals peak input AC line voltage, and minimum DC bus voltage equals peak motor line voltage. The VSI 15 incorporates more intelligent PWM to adapt to the bus voltage regulation.

Figure 17:
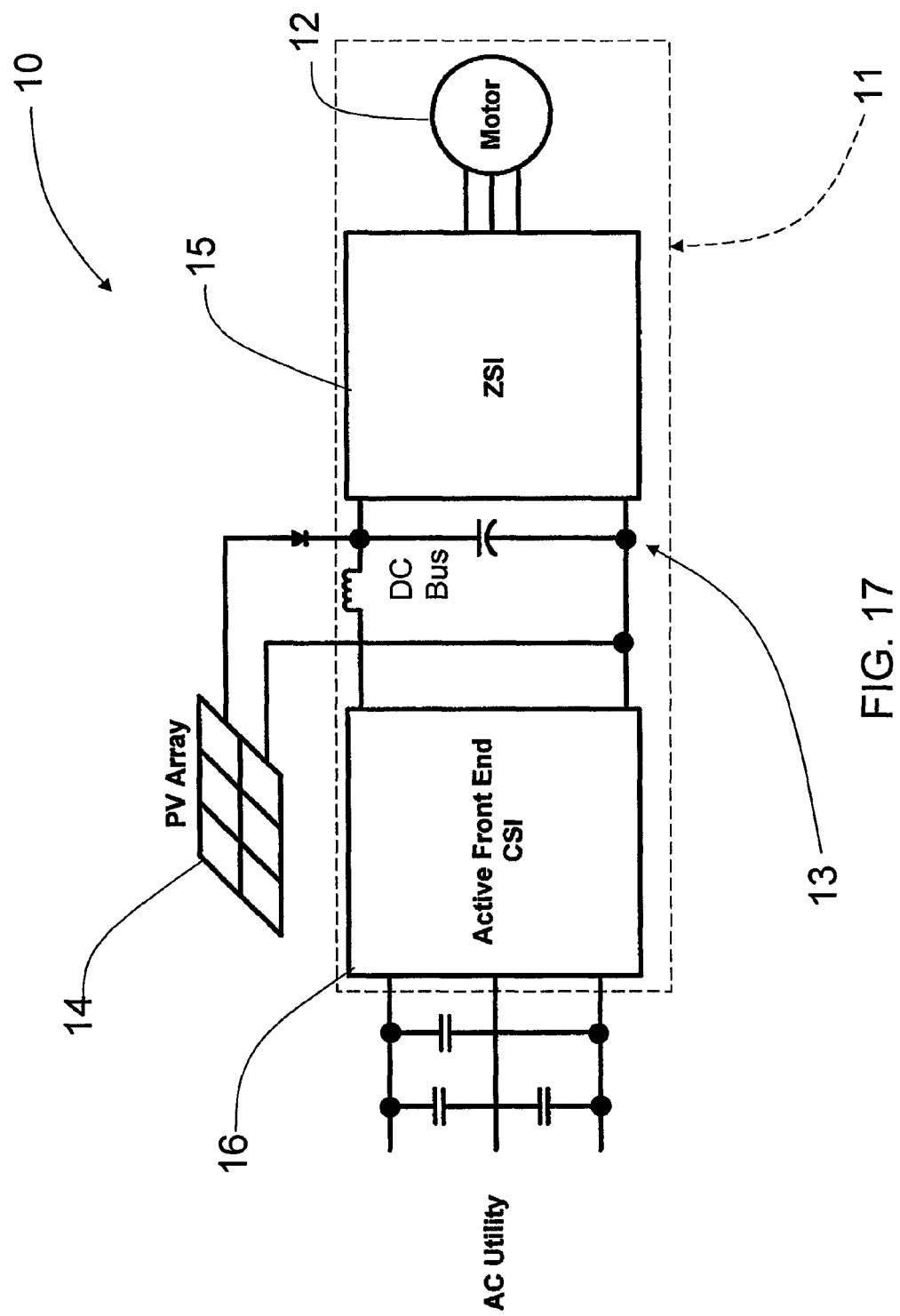
FIG. 17 shows a current source active front end and a Z-source inverter for the system of FIG. 4.

Referring to FIG. 17, an active front-end CSI 16 and ZSI back-end 15 are used. AFE 16 is CSI and motor drive inverter 15 is a Z-source inverter (ZSI). PV source is treated as a variable DC voltage source with voltage regulated by its own MPPT algorithm. The DC bus voltage is regulated by the MPPT command. The maximum DC bus voltage equals peak input AC line voltage, and minimum DC bus voltage equals peak motor line voltage. The ZSI incorporates more intelligent PWM to adapt to the bus voltage regulation.

Figure 18:
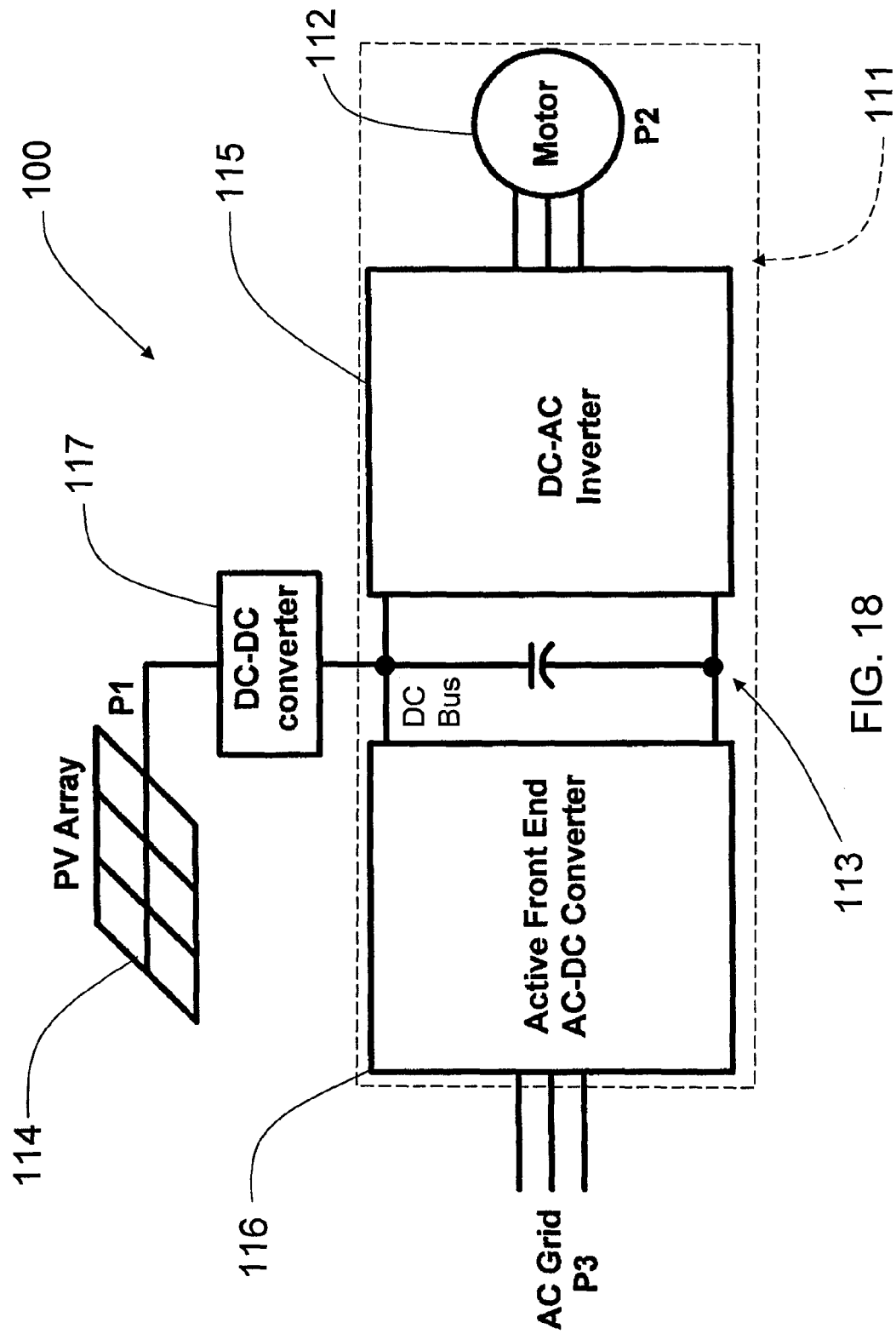
FIG. 18 is a grid-tied inverter/variable frequency drive system according to an embodiment of the invention.

Referring to FIG. 18, a PV-integrated variable frequency drive system according to an embodiment of the invention is illustrated and shown generally at reference numeral 100. Like system 10, system 100 includes a grid-tied variable frequency drive 111 (including motor 112), a DC bus 113, a PV array 114, a DC-AC inverter 115, and an active front end (AFE) AC-DC converter 116.

Unlike system 10, system 100 uses an intermediate DC-DC converter 117 to integrate the PV array 114 into the DC bus 113, thereby interfacing the PV array 114 to the grid through the DC-DC converter. In this case the MPPT and DC bus regulation is performed by the DC-DC converter.

The foregoing has described photovoltaic (PV) integrated variable frequency drive system. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A photovoltaic integrated variable frequency drive system, comprising:
   (a) a variable frequency drive having:
      (i) a DC-AC inverter for converting a direct current into an alternating current and feeding the alternating current to a motor;
      (ii) a DC bus electrically connected to the DC-AC inverter for providing a direct current to the DC-AC inverter;
      (iii) an AC-DC converter electrically connected to the DC bus to facilitate bi-directional power flow to and from a power grid; and
   (b) a photovoltaic array directly connected to the DC bus for providing a DC current to the DC bus.

2. The photovoltaic integrated variable frequency drive system according to claim 1, wherein when an output of the photovoltaic array is greater than a load of the variable frequency drive, the AC-DC converter feeds power back into the power grid.

3. The photovoltaic integrated variable frequency drive system according to claim 1, wherein when the output of the photovoltaic array is equal to the load of the motor, the output of the photovoltaic array is supplied directly to the motor.

4. The photovoltaic integrated variable frequency drive system according to claim 1, wherein when the output of the photovoltaic array is less than the load of the motor, extra power needed by the motor is supplied by the grid.

5. The photovoltaic integrated variable frequency drive system according to claim 1, wherein when the load required by the motor is less than zero, regenerative braking of the motor supplies excess power to the grid.

6. The photovoltaic integrated variable frequency drive system according to claim 1, wherein the DC-AC inverter maintains normal drive operation by using inverter over modulation.

7. The photovoltaic integrated variable frequency drive system according to claim 1, wherein the DC-AC inverter boosts DC bus voltage.

8. A photovoltaic integrated variable frequency drive system, comprising:
   (a) a variable frequency drive having:
      (i) an electric motor;
      (ii) a DC-AC inverter electrically connected to the motor for converting a direct current into an alternating current and feeding the alternating current to the motor;
      (iii) a floating DC bus electrically connected to the DC-AC inverter for providing a direct current to the DC-AC inverter;
      (iv) an AC-DC converter electrically connected to the DC bus to facilitate bi-directional power flow to and from a power grid; and
   (b) a photovoltaic array directly connected to the DC bus for providing a DC current to the DC bus.

9. The photovoltaic integrated variable frequency drive system according to claim 8, further including an intermediate DC-DC converter electrically connected between the DC bus and the photovoltaic array and adapted to integrate the photovoltaic array into the DC bus.

10. The photovoltaic integrated variable frequency drive system according to claim 8, wherein the AC-DC converter is a voltage source inverter adapted to regulate DC bus voltage and perform maximum peak power tracking to maintain the DC bus at an optimum voltage.

* * * * *